Aug. 7, 1951    H. J. BIERMAN    2,563,576
APPARATUS FOR PROCESSING PACKAGED FOOD MATERIAL
Filed Aug. 26, 1947    2 Sheets-Sheet 2
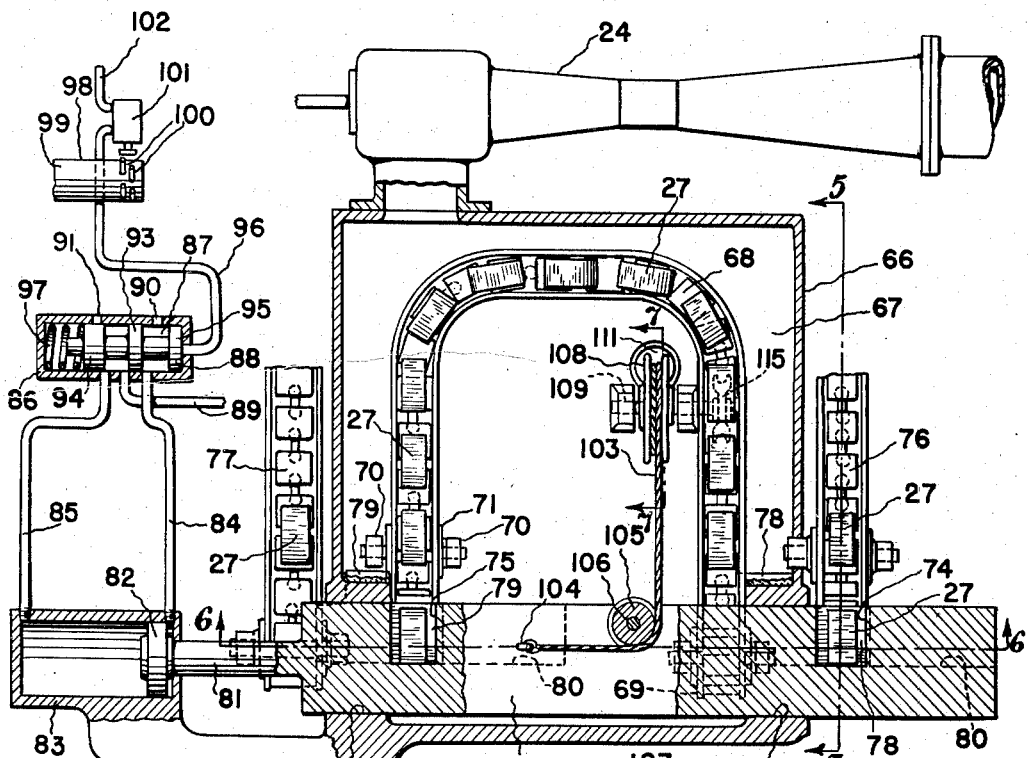
FIG.-4.
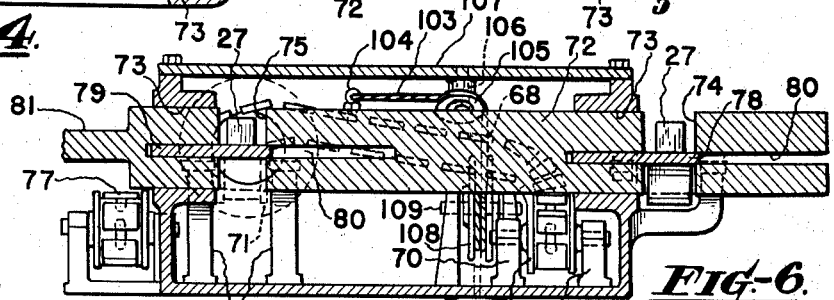
FIG.-6.
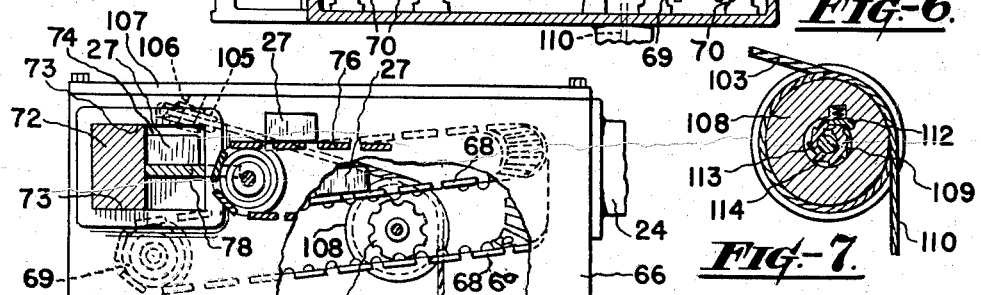
FIG.-5.    FIG.-7.
INVENTOR
HUBERT J. BIERMAN
BY
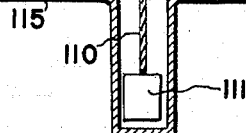
HIS ATTORNEY.

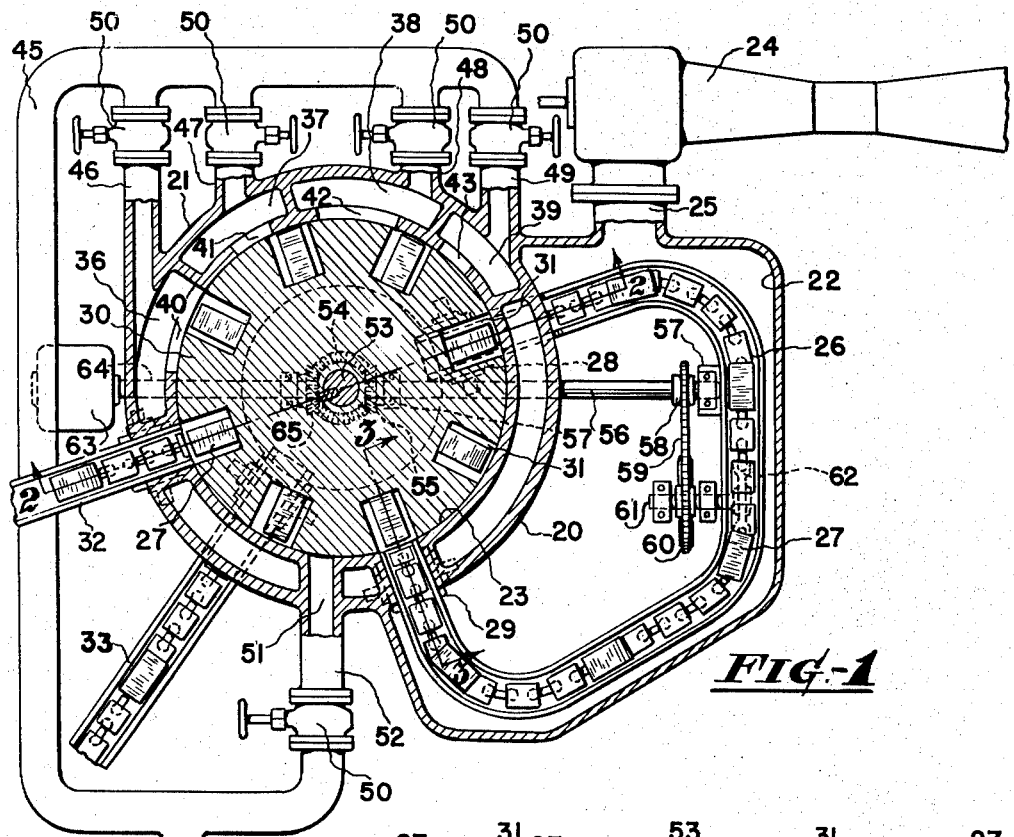

Patented Aug. 7, 1951

2,563,576

UNITED STATES PATENT OFFICE 2,563,576

APPARATUS FOR PROCESSING PACKAGED FOOD MATERIAL

Hubert J. Bierman, Chatham, N. J., assignor to Ingersoll-Rand Company, New York, N. Y., a corporation of New Jersey Application August 26, 1947, Serial No. 770,627

10 Claims. (Cl. 62—152)

This invention relates to food processing apparatus, and more particularly to apparatus of this type suitable for freezing the food in containers.

One object of the invention is to assure the uniform freezing of the food.

Another object is to permit of the continuous and uninterrupted operation of the apparatus.

Still another object is to obviate the need for frequent manual handling of the food during the processing period.

Other objects will be in part obvious and in part pointed out hereinafter.

In the drawings accompanying this specification and in which similar reference numerals refer to similar parts, Figure 1 is a plan view, partly broken away, of a food processing apparatus showing one form that the invention may assume in practice, Figures 2 and 3 are transverse views taken through Figure 1 on the lines 2—2 and 3—3, respectively, Figure 4 is a view similar to Figure 1 showing a modified form of the invention, and Figures 5, 6 and 7 are views taken on the lines 5—5, 6—6 and 7—7, respectively, through Figure 4.

Referring to the drawings, and at first more particularly to the form of the invention shown in Figures 1 to 3 inclusive, the apparatus, designated in general by 20, comprises a casing 21 having a freezing chamber 22 wherein the food is subjected to a high vacuum for freezing it and a transfer chamber 23 through which the food material passes to the chamber 22.

The means serving to create the vacuum in the freezing chamber may, as shown, be a steam ejector 24 the suction chamber of which communicates with the freezing chamber 22 through a conduit 25.

Within the freezing chamber 22 is a conveyor 26, preferably of the endless type, for carrying food in containers 27, as for example cartons or cans, that remain uncovered at their ends during the processing period in order that their contents will be fully exposed to the vacuum within the freezing chamber. The conveyor 26 is arranged in the form of a loop that extends through the freezing chamber 22 and is trained over idler wheels 28 and 29 that lie in the vertical plane of the transfer chamber 23 so that the containers may drop from the latter onto the conveyor 26 and, after passing through the freezing chamber, drop from the conveyor into the transfer chamber.

The food is delivered to and carried away from the conveyor 26 by a rotary plate 30 that has a series of equally spaced recesses 31 in its periphery to receive the food containers and to register with the portions of the conveyor trained over the idler wheels 28 and 29 and also with conveyors 32 and 33 that extend radially of the plate 30 and serve, respectively, to carry food to and from the transfer chamber. The delivery end of the conveyor 32 and the portion of the conveyor trained over the wheel 29 are so located that the food containers 27 will be projected directly into a recess 31 by the conveyors, and the portions of the conveyors 33 and 26 upon which the containers are deposited by the plate 30 are positioned beneath the plate 30 so that when a recess 31 moves into the vertical plane of these portions the containers will drop downwardly upon the conveyors.

The food is normally supported, within the recesses, by an annular table 34 which may be an integral portion of the casing and lies directly beneath the marginal portion of the plate 30. The table 34 is also provided with suitable recesses 35 in the vertical planes of the idler wheel 28 and the conveyor 33 to permit the food to drop therethrough to the conveyors, in the manner indicated in Figure 2 of the drawings.

To the end that the food may be gradually subjected to a decreasing pressure while passing through the transfer chamber to the freezing chamber, the casing 21 is provided with a series of vacuum chambers, four in the present instance, and designated 36, 37, 38 and 39. These chambers lie between the conveyor 32 and the loading end of the conveyor 26. They are of arcuate form and communicate, respectively, with the transfer chamber 23 through ports 40, 41, 42 and 43. The chambers 36, 37, 38 and 39 are evacuated by a pump 44 and communicate, respectively, with the inlet conduit 45 of said pump through branches 46, 47, 48 and 49. Each branch has an adjustable valve 50 for selectively varying the pressure in the vacuum chambers. The vacuum chamber 39, being adjacent the point of transfer of food from the plate 30 to the conveyor 26, serves in addition to prevent the entrance into the freezing chamber 22 of such slight amounts of air that may find its way along the cooperative surfaces of the plate 30 and the adjacent surfaces of the transfer chamber 23.

Further precautions are taken to prevent leakage of air through the transfer chamber into the freezing chamber 22. To this end the casing 21 is provided with a chamber 51 that opens into the transfer chamber 23 at a point between the conveyors 33 and 26. A conduit 52 affords communication between the chamber 51 and the vacuum pump 44 and is controlled by a valve 50.

In the form of the invention illustrated, movement is imparted to the conveyor 26 from the rotary plate 30. The plate 30 accordingly has a shaft 53 extending axially therethrough, and on the end portion of the shaft lying below the casing 21 is a gear 54 that meshes with a pinion 55 carried by a shaft 56. The shaft 56 is supported by bearings 57 and carries a wheel 58 for driving a belt 59 which is trained over a wheel 60 suitably affixed to a shaft 61 carrying a sprocket wheel 62 that interlockingly engages the conveyor 26 for driving it. The plate 30 is driven by a suitable variable speed motor 63 the shaft 64 of which carries a pinion 65 to mesh with the gear 54.

The operation of the device is as follows: Let it be assumed that the conveyors and the plate 30 are operating at desired speeds, that the ejector 24 and the vacuum pump 44 are in operation and that the valves 50 are so adjusted as to assure the desired pressures within the chambers 36 to 39 and the chamber 51. Under these conditions, containers of food conveyed to the transfer chamber 23 by the conveyor 32 will be deposited into successive recesses 31 accordingly as said recesses move into registry with the conveyor, and when the recesses move into communication with the ports 40 to 43 the air is removed therefrom by the vacuum pump 44. When the recesses 31 move into registry with the recess 35 adjacent the chamber 39 the containers will drop therethrough onto the conveyor 26. As will be readily understood, the spacing of the containers 27 with respect to each other upon the conveyor will be determined by the spacing of the recesses 31 with respect to each other and, of course, also by the relative speeds of the plate 30 and the conveyor 26.

These speeds are constant for each variety of food and are so selected that the food within the containers will be completely frozen by the time it reaches the point of transfer to a recess 31 and that a container will be transferred to the plate 30 as each recess 31 moves into registry with the portion of the conveyor trained over the wheel 29.

Upon being transferred to the plate 30 from the conveyor 26 the food is carried in the direction of the conveyor 33 and when a recess 31 moves into registry with the recess 35 adjacent said conveyor the container will fall thereupon for removal from the processing apparatus.

In the form of the invention shown in Figures 4 to 7, inclusive, the portion of the casing 66 defining the freezing chamber 67 is of substantially rectangular shape and the conveyor 68 within the freezing chamber, shown as being of the endless type, is arranged in the form of a U. One stem end portion of the conveyor is trained over an idler wheel 69 supported by standards 70 resting upon the bottom of the freezing chamber 67. The idler wheel 71 supporting the other stem end portion of the conveyor is also supported by standards 70 seated upon the bottom of the freezing chamber 67 but is positioned at a higher elevation than the wheel 69. Owing to this arrangement, the conveyor 68 inclines gradually from the idler wheel 69 to the idler wheel 71.

The portions of the conveyor trained over the wheels 69—71 are advantageously positioned for depositing the containers upon the conveyor 68 and for transferring them to a carrier 72 at one end of the freezing chamber and serving to deliver the food to and carrying it away from the conveyor 68. The carrier 72 is shown as being in the form of a bar of rectangular shape. It is reciprocable transversely of the stem portions of the conveyor 68 being slidable in apertures 73 in the casing 66. In the side of the carrier 72 confronting the chamber 67 are recesses 74 and 75 that extend from the upper to the lower surfaces of the carrier to receive the containers.

The recesses are so spaced with respect to each other that one recess will lie in the vertical plane of a stem end portion of the conveyor 68 and the other recess will lie exteriorly of the casing 66 and in the vertical plane of a conveyor lying exteriorly of the casing 66. Two such conveyors designated 76 and 77 are shown and serve, respectively, to deliver containers to the carrier and to convey them from the carrier.

During their transfer from one conveyor to another the containers rest upon stationary horizontal plates 78 and 79 that may be supported by the casing 66 in any suitable manner and extend into slots 80 in the carrier 72. The plate 78 lies across the end of the conveyor 76 and extends to a point coincident with the vertical plane of the adjacent side of the conveyor 68. Owing to this arrangement, the containers are transferred directly from the conveyor 76 onto the adjacent plate 78 and, upon movement of the carrier 72, the container will slide along the plate 78 until the recess 74 moves out of the plane of the plate. The container 27 will then fall through the recess onto the conveyor 68.

The plate 79 is, on the other hand, so positioned that an end portion lies in front of the idler wheel 71 and its opposite end in the vertical plane of the adjacent side of the conveyor 77. By reason of this arrangement the containers delivered to the plate 79 will be carried along its upper surface by the carrier 72 and when the recess 75 moves into the vertical plane of the conveyor 77 the container will drop thereon.

In the form of the invention shown, the carrier 72 is actuated by pressure fluid and is accordingly provided at one end with a stem 81 carrying a piston 82 that reciprocates within a cylinder 83 on the casing 66. Pressure fluid is conveyed to the ends of the cylinder 83 by pipes 84 and 85 leading from a casing 86 having a valve chamber 87 for a distributing valve 88. The pressure fluid distributed thereby is conveyed to the chamber 87 from a source of supply (not shown) by a conduit 89 that communicates with the chamber 87 at a point intermediate the pipes 84—85. The casing 86 is provided with free exhaust ports 90 and 91 that are controlled by the valve 88.

The valve 88 is shown as being of the spool type having a flange 93 and end heads 94 and 95. The heads 94—95 are so spaced with respect to the flange that in one limiting position of the valve the pipe 84 will be in communication with the exhaust port 90 through the space between the flange 93 and the head 95. The pipe 85 will then be in communication with the supply conduit 89 through the space between the flange 93 and the head 94 and the exhaust port 91 will be blanked-off by the head 94.

In the opposite limiting position of the valve the head 95 will cut-off communication between the pipe 84 and the exhaust port 90 and pressure fluid will flow from the supply conduit 89 through the space between the flange 93 and the head 95 into the pipe 84. The pipe 85 will then also be in communication with the atmosphere through the space between the flange 93 and the head 94 and through the exhaust port 91.

The valve 88 is actuated to and held in the latter position by pressure fluid conveyed into an end of the valve chamber by a conduit 96, and its return movement is effected by a spring 97 in the opposite end of the valve chamber 87. The pressure fluid supply for actuating the valve 88 is controlled by a time cycle controller 98 of the type disclosed in United States Patent No. 2,272,237 to W. J. Brown et al. and which, described only briefly herein, comprises a rotary drum 99 carrying a series of stops 100 for actuating a valve mechanism 101 that controls the flow of pressure fluid from a supply conduit 102 to the conduit 96.

To the end that the movements of the carrier 72 and the conveyor 68 may be correctly synchronized with each other in order that the recess 75 will be in position to receive a container of frozen food at the time of the arrival of such container at the point of transfer from the conveyor to the carrier, movement is transmitted from the carrier to the conveyor 68. The means serving this purpose comprises, in a preferred form, a rope or cable 103 connected at one end to an anchor bolt 104 on the carrier 72. The adjacent portion of the cable 103 extends longitudinally of the carrier and is trained over an idler wheel 105 on a shaft 106 depending from the cover 107 of the casing 66.

The cable 103 makes a right-angle turn at the idler wheel and is wound around a sheave 108 rotatable upon a shaft 109 in the freezing chamber 67, and on the free depending end portion 110 of the cable is a weight 111 that constantly maintains the cable taut and in firm contact with the idler wheel 105 and the sheave 108. The sheave 108 lies in parallelism with a leg of the conveyor 68 and in its hub portion is a spring-pressed pawl 112 for engagement with the teeth 113 of a ratchet wheel 114 keyed to the shaft 109 carrying a sprocket wheel 115 that is in driving engagement with the conveyor 68. By reason of this arrangement the sheave 108 will rotate freely in one direction about the shaft 109 when the carrier 72 moves in the direction of the conveyor 76, and when the carrier moves in the opposite direction the pawl 112 will engage a tooth 113 of the ratchet wheel 114 and causes the shaft 109 and the sprocket wheel 115 to rotate and thereby move the conveyor 68 in step-by-step fashion for moving the containers through the freezing chamber.

In the operation of the device and assuming the drum 99 of the time cycle controller to be rotating at a constant rate and the carrier 72 and the valve 88 to be in the positions shown in Figure 4 of the drawings, a stop 100 will actuate the valve mechanism 101 to admit pressure fluid from the supply conduit 102 through the conduit 96 into the valve chamber 87. The valve will be shifted thereby to its left hand limiting position and pressure fluid will then flow from the conduit 89 through the valve chamber and the pipe 84 into the right hand end of the cylinder 83 and move the piston 82 and the carrier 72 leftward. The container in the recess 74 will slide along the plate 78 until the recess moves out of the plane of the plate 78 whereupon the container will drop through the lower portion of the recess 74 onto the conveyor 68. Simultaneously therewith, a container previously transferred from the conveyor 68 to the recess 75 will slide along the plate 79 and when the recess 75 moves out of the plane of the plate the container will fall onto the conveyor 77 for removal from the processing apparatus. During movement of the carrier in the direction described, the pawl 112 will interlockingly engage a tooth of the ratchet wheel 114 and the cable 103 will cause the sprocket wheel 115 to describe a partial revolution and thereby impart movement to the conveyor 68 for moving the containers toward the point of transfer to the recess 75.

When the carrier 72 reaches the end of its stroke a stop 100 will actuate the valve mechanism 101 for exhausting the pressure fluid from the valve chamber 87. The spring 97 will then shift the valve 88 and establish communication between the supply conduit 89 and the pipe 85 through the space between the flange 93 and the head 94 of the valve. Pressure fluid thereby admitted into the left hand end of the cylinder 83 will return the carrier to its initial position for transferring another container from the conveyor 76 to the recess 74 and to transfer a container from the conveyor 68 to the recess 75.

The apparatus may continue to operate uninterruptedly, in the manner described, to deliver containers to and carry them from the freezing chamber and, as will be readily understood, the speed of operation of the carrier and of the conveyors may vary in accordance with variation in the time required for freezing different kinds of food, but in each case these elements will operate at such a rate that the food will be completely frozen by the time the containers arrive at the point of transfer from the freezing chamber to the carrier.

I claim:

1. Apparatus for freezing food material, comprising a casing having a chamber to receive food for processing, means for maintaining a processing temperature in the chamber, a conveyor for carrying such food through the chamber during the processing thereof, and a carrier for delivering the food to and from the conveyor.

2. Apparatus for processing food material, comprising a casing having a chamber to receive food for processing, means for maintaining a processing temperature in the chamber, a conveyor for carrying such food through the chamber and operating at a constant rate of speed, and a carrier for delivering food to the conveyor at a constant rate and to carry such food from the conveyor.

3. Apparatus for processing food material, comprising a casing having a freezing chamber and a transfer chamber, means for maintaining a freezing vacuum in the freezing chamber, a conveyor for carrying food through the freezing chamber, a carrier in the transfer chamber for delivering food to the conveyor, means for subjecting such food to vacuum during the passage thereof through the transfer chamber, and means for varying the degree of vacuum along the path of movement of the food through the transfer chamber.

4. Apparatus for processing food material, comprising a casing having a freezing chamber and a transfer chamber, means for maintaining a freezing vacuum in the freezing chamber, a conveyor for carrying food through the freezing chamber, a rotary carrier in the transfer chamber having recesses for food to register with the conveyor for transferring such food from the carrier to the conveyor, and means for gradually reducing the pressure in the recesses and the food therein during its passage through the transfer chamber.

5. Apparatus for processing food material, comprising a casing having a freezing chamber and a transfer chamber, means for maintaining a freezing vacuum in the freezing chamber, a conveyor for carrying food through the freezing chamber, a carrier in the transfer chamber for delivering food to and carrying it from the freezing chamber, means for subjecting such food to a vacuum during the passage thereof through the transfer chamber to the freezing chamber, and means for driving the conveyor and the carrier at relatively constant rates of speed.

6. Apparatus for processing food material, comprising a casing having a freezing chamber, means for maintaining a freezing vacuum in the chamber, a conveyor for carrying food through the freezing chamber during the freezing thereof, a reciprocatory carrier for delivering food to and conveying such food from the conveyor, and means for effecting the distribution of power medium to the reciprocatory carrier for actuating said carrier.

7. Apparatus for processing food material, comprising a casing having a freezing chamber, means for maintaining a freezing vacuum in the chamber, a conveyor for moving food through the chamber during the freezing thereof, a fluid actuated reciprocatory carrier for delivering food to and conveying such food from the conveyor and having opposed actuating surfaces, and a valve for distributing pressure fluid alternately to the actuating surfaces for effecting reciprocatory movement of the carrier.

8. Apparatus for processing food material, comprising a casing having a freezing chamber, means for maintaining a freezing vacuum in the chamber, a conveyor for moving food through the chamber during the freezing thereof, a fluid actuated reciprocatory carrier for delivering food to and conveying such food from the conveyor and having opposed actuating surfaces, a valve for distributing pressure fluid alternately to the actuating surfaces for effecting reciprocatory movement of the carrier, and a timing device for controlling the movements of the valve.

9. Apparatus for processing food material, comprising a casing having a freezing chamber, means for maintaining a freezing vacuum in the chamber, a conveyor for moving food through the chamber during the freezing thereof, a reciprocatory carrier for delivering food to and conveying such food from the conveyor, and means for transmitting movement from the carrier to the conveyor.

10. Apparatus for processing food material, comprising a casing having a freezing chamber, means for maintaining a freezing vacuum in the chamber, a conveyor for moving food through the chamber during the freezing thereof, a reciprocatory carrier for delivering food to and conveying such food from the conveyor and having opposed actuating surfaces, a valve for distributing pressure fluid alternately to the actuating surfaces for effecting reciprocatory movement of the carrier, and means for transmitting movement from the carrier to the conveyor.

HUBERT J. BIERMAN.

REFERENCES CITED

The following references are of record in the file of this patent:

UNITED STATES PATENTS

| Number | Name | Date |
|---|---|---|
| 888,257 | Passburg | May 19, 1908 |
| 1,079,150 | Sleeper | Nov. 18, 1913 |
| 1,930,414 | Buhr | Oct. 10, 1933 |
| 2,021,772 | Fleisher | Nov. 19, 1935 |
| 2,123,080 | Rowland | July 5, 1938 |
| 2,123,969 | Downey | Nov. 15, 1938 |